United States Patent
Norris et al.

(10) Patent No.: US 10,460,129 B2
(45) Date of Patent: Oct. 29, 2019

(54) SYSTEM AND METHOD FOR MANAGING COOPERATIVE SYNTHETIC IDENTITIES FOR PRIVACY PROTECTION THROUGH IDENTITY OBFUSCATION AND SYNTHESIS

(71) Applicant: CA, Inc., New York, NY (US)

(72) Inventors: Diane Norris, Canonsburg, PA (US); Debra Danielson, Skillman, NJ (US); Carol Piccus, Herndon, VA (US); Karen Sleeth, Durham, NC (US); Stephen Tyler, McKinney, TX (US)

(73) Assignee: CA, Inc., New York, NY (US)

( * ) Notice: Subject to any disclaimer, the term of this patent is extended or adjusted under 35 U.S.C. 154(b) by 57 days.

(21) Appl. No.: 15/404,722

(22) Filed: Jan. 12, 2017

(65) Prior Publication Data
US 2018/0196961 A1 Jul. 12, 2018

(51) Int. Cl.
*G06F 21/62* (2013.01)

(52) U.S. Cl.
CPC .. *G06F 21/6254* (2013.01); *G06F 2221/2143* (2013.01)

(58) Field of Classification Search
CPC ............. G06F 21/6254; G06F 2221/2143
See application file for complete search history.

(56) References Cited

U.S. PATENT DOCUMENTS

| | | | |
|---|---|---|---|
| 7,158,979 B2 | 1/2007 | Iverson et al. | |
| 9,344,407 B1* | 5/2016 | McClintock | H04L 63/0407 |
| 9,372,987 B1* | 6/2016 | Ashley | G06F 21/6254 |
| 2004/0199789 A1 | 10/2004 | Shaw et al. | |
| 2004/0205080 A1 | 10/2004 | Patel | |
| 2005/0137981 A1* | 6/2005 | Maes | H04L 29/12009 705/44 |
| 2005/0283620 A1 | 12/2005 | Khulusi et al. | |
| 2006/0095454 A1 | 5/2006 | Shankar et al. | |
| 2009/0158441 A1* | 6/2009 | Mohler | G06F 21/552 726/27 |
| 2014/0046777 A1* | 2/2014 | Markey | G06Q 30/0269 705/14.66 |

(Continued)

OTHER PUBLICATIONS

David Talbot, "How to Mine Cell-Phone Data Without Invading Your Privacy", https://www.technologyreview.com/s/514676/how-to-mine-cell-phone-data-without-invading-your-privacy/, May 13, 2013, pp. 1-8.

(Continued)

*Primary Examiner* — Meng Li
(74) *Attorney, Agent, or Firm* — Baker Botts L.L.P.

(57) ABSTRACT

According to one embodiment of the disclosure, a method includes receiving, from a first requestor, a request to create a cooperative synthetic identity case for an original identity. The method includes determining whether a cooperative synthetic identity case has already been created for the original identity. The method also includes generating a case identifier that uniquely identifies the cooperative synthetic identity case. The method further includes associating the case identifier with an expiration period. The method also includes storing the cooperative synthetic identity case, the case identifier, and the expiration period to a memory. The method also includes sending the case identifier to the first requestor.

14 Claims, 6 Drawing Sheets

(56) References Cited

U.S. PATENT DOCUMENTS

| | | | |
|---|---|---|---|
| 2014/0074471 A1* | 3/2014 | Sankar | G10L 17/02 704/246 |
| 2015/0113659 A1 | 4/2015 | D'Costa et al. | |
| 2015/0142865 A1* | 5/2015 | Shimizu | H04L 67/10 709/201 |
| 2018/0096102 A1* | 4/2018 | Akinmeji | G06F 21/6254 |

OTHER PUBLICATIONS

Paolo Boldi et al., "Injecting Uncertainty in Graphs for Identity Obfuscation", http://www.open.ac.il/Personal_sites/tamirtassa/Download/Journals/uncertainty.pdf.

* cited by examiner

SYSTEM AND METHOD FOR MANAGING COOPERATIVE SYNTHETIC IDENTITIES FOR PRIVACY PROTECTION THROUGH IDENTITY OBFUSCATION AND SYNTHESIS

BACKGROUND

The disclosure relates generally to synthetic identities, and more specifically to a system and method for managing cooperative synthetic identities for privacy protection through identity obfuscation and synthesis.

SUMMARY

According to one embodiment of the disclosure, a method includes receiving, from a first requestor, a request to create a cooperative synthetic identity case for an original identity. The method includes determining whether a cooperative synthetic identity case has already been created for the original identity. The method also includes generating a case identifier that uniquely identifies the cooperative synthetic identity case. The method further includes associating the case identifier with an expiration period. The method also includes storing the cooperative synthetic identity case, the case identifier, and the expiration period to a memory. The method also includes sending the case identifier to the first requestor.

According to another embodiment of the disclosure, a method includes determining a first original identifier. The original identifier uniquely identifies a first original identity. The method also includes sending a request to a cooperative synthetic identity manager to create a first cooperative synthetic identity case for the first original identity. The method further includes receiving, from the cooperative synthetic identity manager, a first case identifier that uniquely identifies the first cooperative synthetic identity case. The method also includes requesting, from a first data entity, first cooperative synthetic identity information for the first original identity. The first cooperative synthetic identity information request comprises the first case identifier and the first original identifier. The method also includes receiving, from the first data entity, the first cooperative synthetic identity information.

According to another embodiment of the disclosure, a method includes receiving, from an analyzing entity, a request for first cooperative synthetic identity information. The first cooperative synthetic identity information request comprises a first case identifier and a first original identifier. The first original identifier uniquely identifies a first original identity. The method also includes determining, based on the first original identifier, a plurality of information corresponding to the first original identity.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
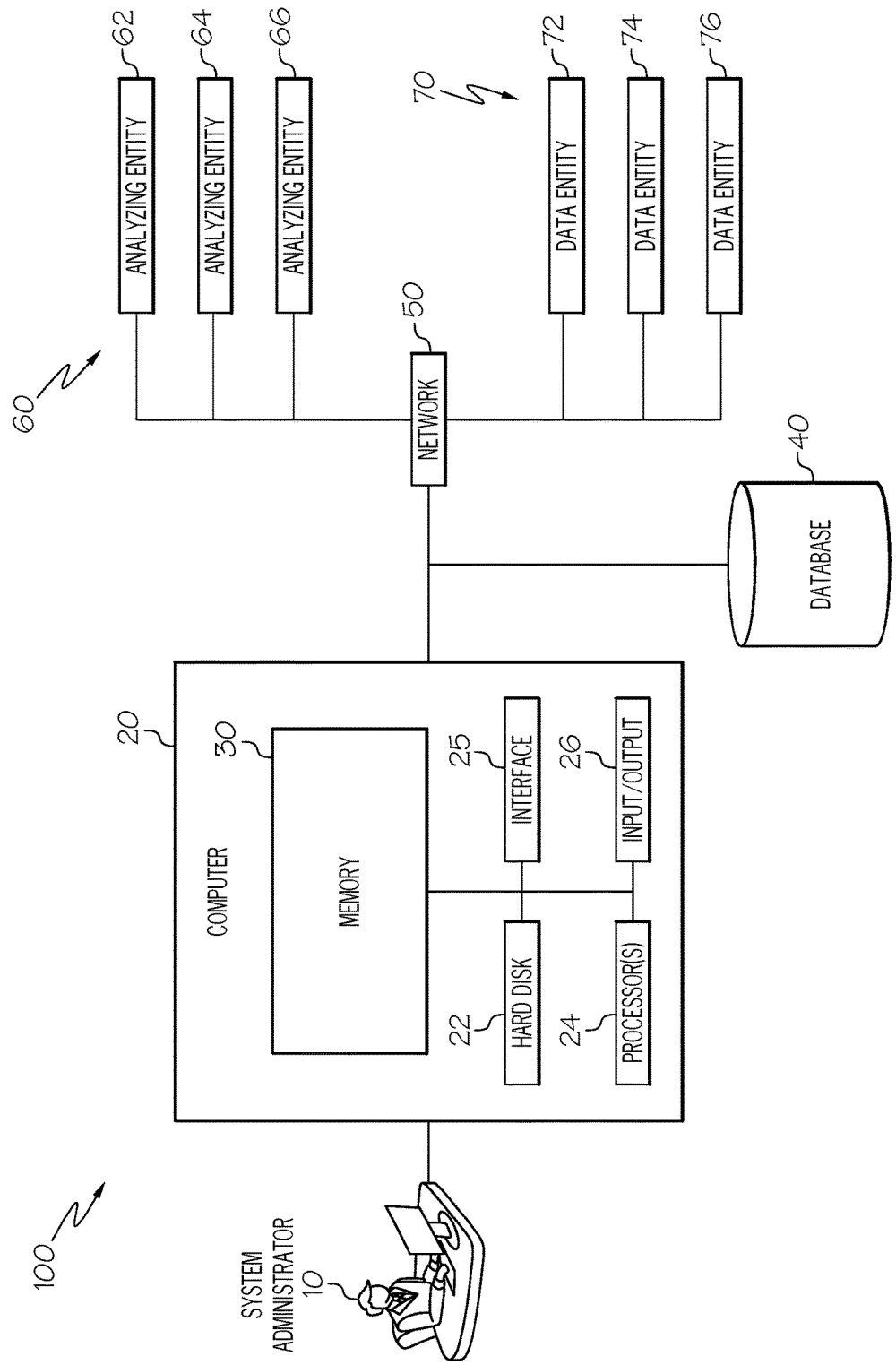
FIG. 1 illustrates a block diagram of a system for managing cooperative synthetic identities in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Many agencies, companies, and other entities seek to leverage data or other information collected across different organizations to analyze patterns of behavior and/or characteristics and create or navigate a social graph of inter-identity relationships. For example, in searching for potential terrorist activity, a government agency such as the National Security Agency (NSA) can collect the numbers, location data, and call duration for any phone communication. From this, the NSA can begin to construct a social graph including the identity of every person or entity with which an individual or entity has electronically communicated. This social graph can help the NSA identify potential or current terrorist activity.

When the collected data and resultant behavioral analysis and social graphs contain personally identifiable information or sensitive personal information, they represent a threat to personal privacy. Methods for obfuscating identities while retaining the benefits of behavior- and characteristic-based analysis and social relationship mapping across organizations are needed.

An embodiment of the present disclosure creates cooperative synthetic identities that allows sharing of data that is free of personally identifiable information or sensitive personal information, therefore being compliant with applicable privacy legislation. The cooperative synthetic identities allow the data to remain referentially and otherwise intact. These datasets enable cross-organizational analytics for gaining insight into patterns of social and communications behavior. For each dataset standalone, standard data masking techniques can be used to obfuscate sensitive data, but if the data sets are to be shared and integrated in a way that preserves identity relationships despite the identities themselves being obfuscated, the masking of identity in each dataset must be done consistently across the datasets. Cooperative synthetic identities enable this consistency. The cooperative synthetic identities also provide a means for generating cross-organizational test data while protecting personal privacy.

An advantage of embodiments of the present disclosure include the ability to perform behavioral or social analytics across multiple organizations without exposing personally identifiable information or sensitive personal information and the ability to distribute data so that no one entity has complete access to all information. Moreover, the identity information transmitted in cooperative synthetic identities is synthetic. Replacing personally identifiable information or sensitive personal information with synthetic information allows the agency or other entity to perform analytical correlation while preserving the analyzed person's personally identifiable information or sensitive personal information. The synthetic information also need not be encrypted when it is sent, as it is synthetic. Accordingly, the transmittal of the identity information can be done in a less secure, less costly manner without as much risk of loss of important, personal information. The cooperative synthetic identities allow an entity to maintain consistency of synthetic data across multiple collecting organizations or entity and across multiple transmissions. Rather than an agency needing to redo all of its analysis or attain different synthetic information a second or third time requesting information for the same person, the information is uniform across all requests and across all entities. In this manner, cooperative synthetic in accordance with the present disclosure provides consistent data masking. Cooperative synthetic identities also protect the analyzing and/or collecting agencies' liability, as the data is hiding the true identity of the person being analyzed, and the true identity may only be released through legal action, such as a court order, subpoena, or warrant. This protects the individual's privacy rights, reduces the number of challenges the agencies or entities analyzing or collecting the data will have to face, and protects against potential internal or external malicious use of the data (for example, through hacking). The use of cooperative synthetic identities protects individual identities while preserving the entire analytical benefit of creating social graphs, for example preserving graph topology, infrastructure, and referential integrity. Cooperative synthetic identities can be associated with specific cases and also can be destroyed on expiration of a certain period. Cooperative synthetic identities can also provide strong test data for behavioral and social mapping while protecting personally identifiable information and sensitive personal information.

Particular benefits of the present disclosure include, without limitation, the use of consistent data masking in generating the synthetic identity, the ability to supply the synthetic identity information (that corresponds to personally identifiable information or sensitive personal information) as part of the cooperative synthetic identity, the bounding of the cooperative synthetic identities by association to a case, the ability for cooperative synthetic identities to expire, the ability to tie-back to a real identity if needed, for example on court order, the expiration of cooperative synthetic identities and their corresponding data, and the concept of cooperative identities that contain synthetic data that are managed by a cooperative synthetic identity manager.

With reference to FIG. 1, a system 100 for managing cooperative synthetic identities is illustrated in accordance with a non-limiting embodiment of the present disclosure. System 100 includes a computer 20, which has a memory 30, a hard disk 22, interface 25, and input/output (I/O) 26. Processor(s) 24 run instructions stored in memory 30, for example a cooperative synthetic identity manager. System administrator 10 uses computer 20. System 100 also includes database 40 and network 50, which connects one or more analyzing entities 60 and one or more data entities 70 to computer 20. Analyzing entities 60 may include analyzing entity 62, analyzing entity 64, and analyzing entity 66. Analyzing entities may include, for example, government agencies such as the National Security Agency (NSA) or the Federal Bureau of Investigation (FBI), social media companies such as Facebook or Twitter, or any other entity that analyzes data. Data entities 70 may include data entity 72, data entity 74, and data entity 76. Data entities may include, for example, cell phone providers, Internet service providers, or any other entity that collects and stores data.

Figure 2:
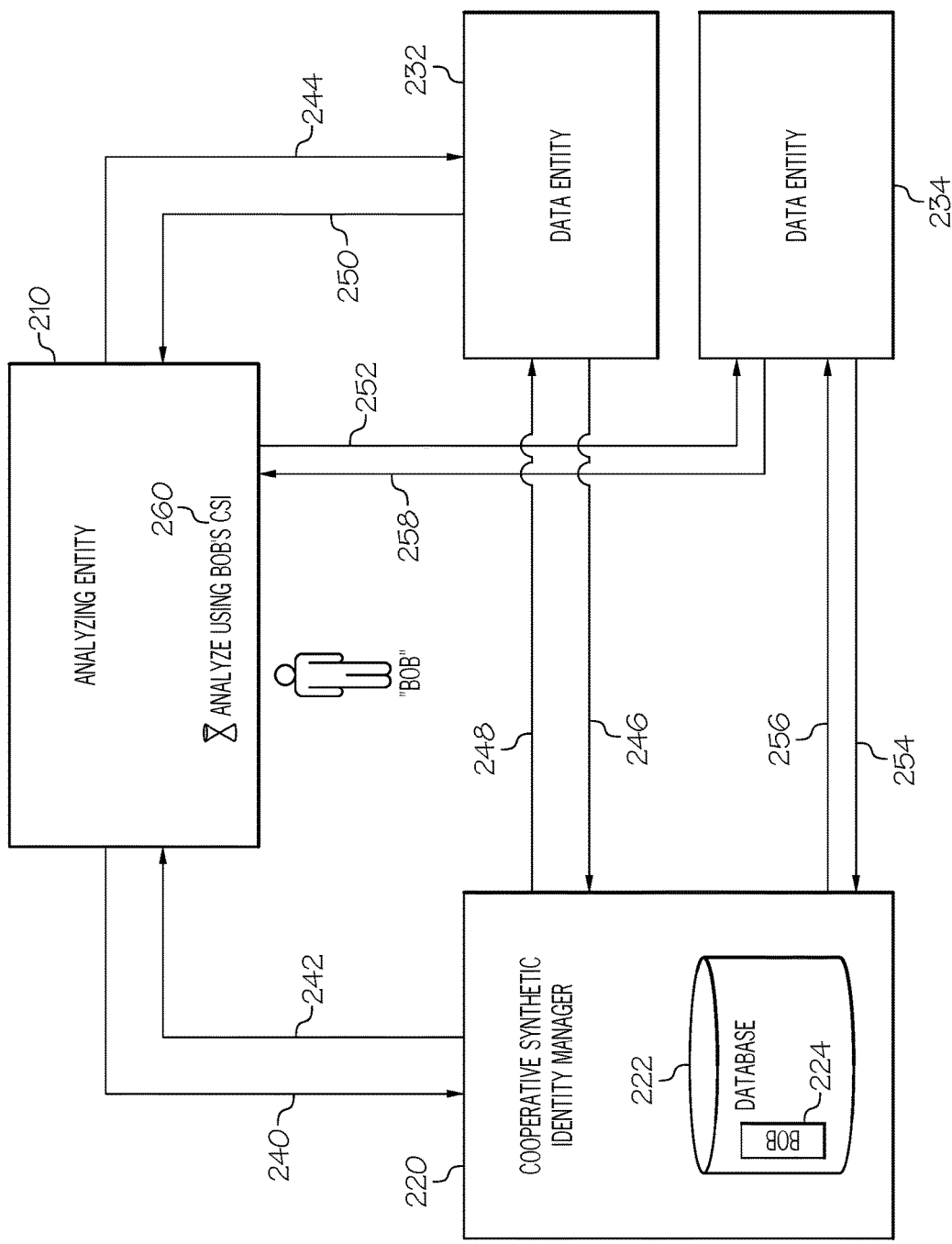
FIG. 2 illustrates a block diagram of a system for managing cooperative synthetic identities in accordance with a non-limiting embodiment of the present disclosure.

With reference to FIG. 2, a system 200 for managing cooperative synthetic identities is illustrated in accordance with a non-limiting embodiment of the present disclosure. System 200 includes analyzing entity 210, one or more data entities 232 and 234, and cooperative synthetic identity manager 220. Cooperative synthetic identity manager 220 communicates with database 222, which stores one or more pieces of information. At step 240, analyzing entity 210 requests a cooperative synthetic identity case for a user, for example "Bob." Cooperative synthetic identity manager 220 may create a cooperative synthetic identity case and an identifier for the case. Cooperative synthetic identity manager 220 may store the case identifier in database 222. At step 242, cooperative synthetic identity manager 220 may return the case identifier for Bob to analyzing entity 210. At step 244, analyzing entity 210 may request data for Bob from data entity 232. At step 246, data entity 232 may request cooperative synthetic identity information (CSII) for Bob from cooperative synthetic identity manager 220. At step 248, cooperative synthetic identity manager 220 may return the cooperative synthetic identity information for Bob to data entity 232. At step 250, data entity 232 may return the cooperative synthetic identity information to analyzing entity 210. Analyzing entity 210 may also request data for Bob at step 252 from a second data entity, data entity 234. At step 245, data entity 234 may request cooperative synthetic identity information for Bob. Cooperative synthetic identity manager 220 may check database 220 to see if cooperative synthetic identity information for Bob has been saved. If cooperative synthetic identity information 224 for Bob is found in database 222, at step 256, cooperative synthetic identity manager 220 may return the cooperative synthetic identity information for Bob to data entity 234, which will in turn return cooperative synthetic identity information for Bob to analyzing entity 210 at step 258.

Figure 3:
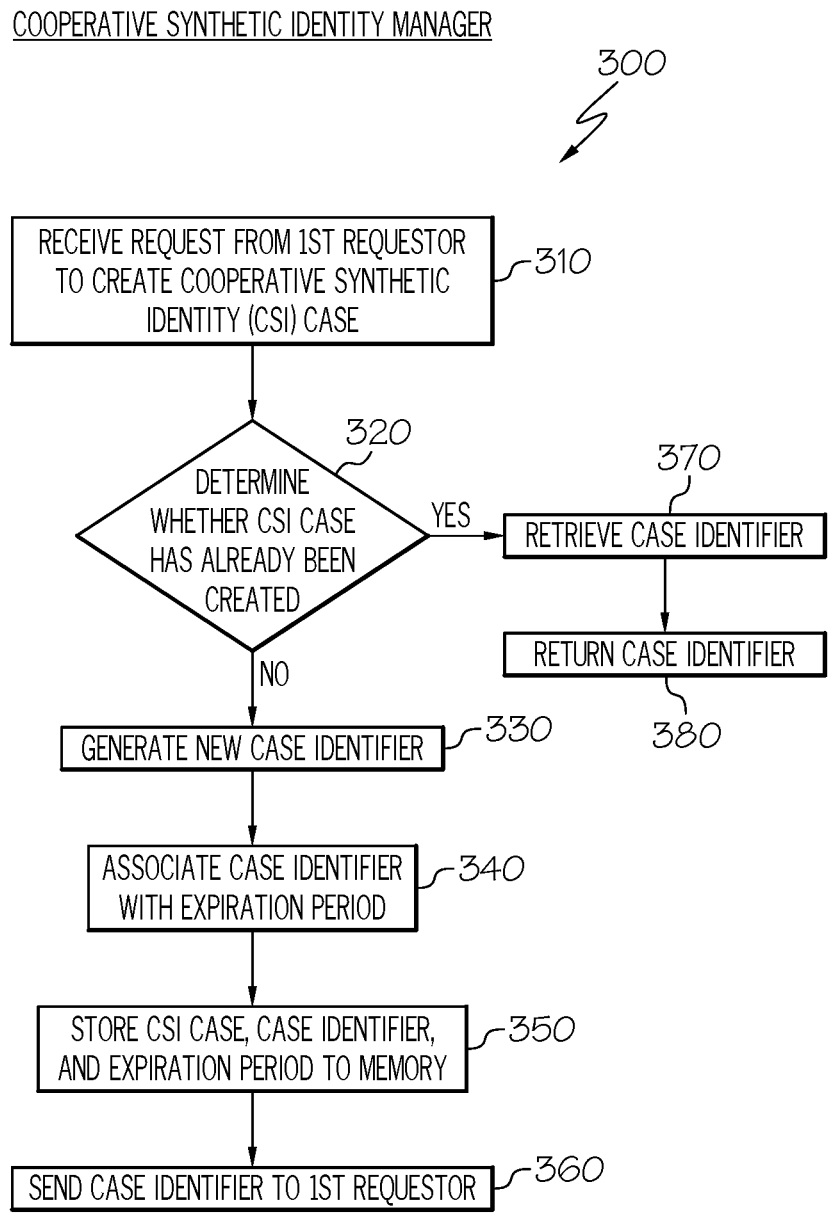
FIG. 3 illustrates a flow chart of a method for managing cooperative synthetic identities in accordance with a non-limiting embodiment of the present disclosure.

With reference to FIG. 3, a method 300 for managing cooperative synthetic identities is illustrated in accordance with a non-limiting embodiment of the present disclosure. A cooperative synthetic identity manager may be implemented in hardware and/or in software. At step 310, the method receives a request from a first requestor to create a cooperative synthetic identity case for an original identity. The method may receive all of the data or only a minimum amount of data, the minimum amount that is necessary for an entity to correlate identities across organizations. At step 320, the method determines whether a cooperative synthetic identity case has already been created for an original identity. If a case has already been created, then at step 370 the method retrieves a case identifier for the original identity and at step 380, returns the case identifier for the original identity to the first requestor. At step 330, if the method determines that a cooperative synthetic identity case has not yet been created, the method generates a case identifier that uniquely identifies the cooperative synthetic identity case. At step 340, the method associates the case identifier with an expiration period. At step 350, the method stores the cooperative synthetic identity case, the case identifier, and/or the expiration period to a memory. At step 360, the method sends the case identifier to the first requestor. The first requestor may be any entity, including an analyzing entity (such as the NSA) or a data entity (such a cell phone provider).

Figure 4:
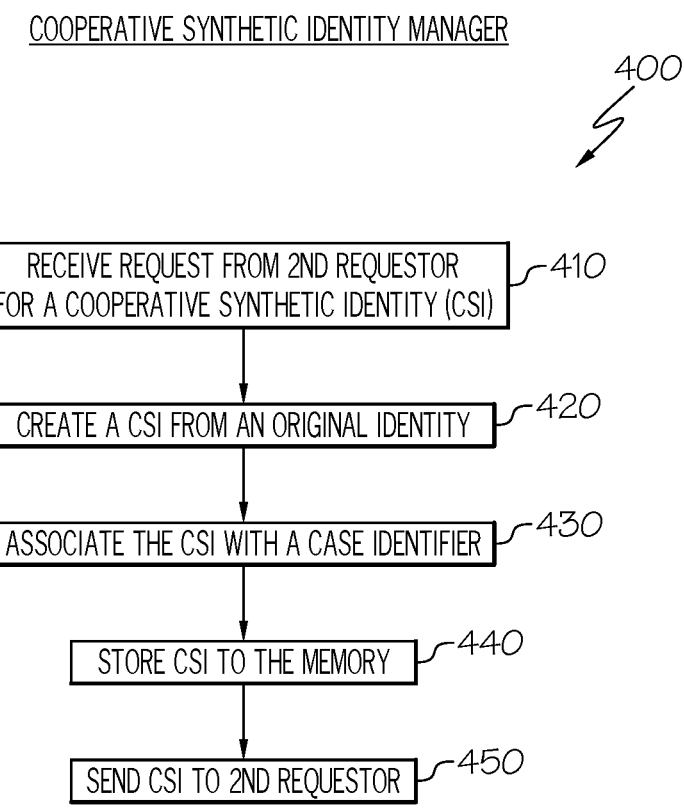
FIG. 4 illustrates a flow chart of a method for managing cooperative synthetic identities in accordance with a non-limiting embodiment of the present disclosure.

With reference to FIG. 4, a method 400 for managing cooperative synthetic identities is illustrated in accordance with a non-limiting embodiment of the present disclosure. At step 410, the method receives a request from a second requestor for cooperative synthetic identity information. The method may receive all of the data or only a minimum amount of data, the minimum amount that is necessary for an entity to correlate identities across organizations. The cooperative synthetic identity information request may comprise one or more of a case identifier for the original identity and information corresponding to the original identity. This information may include real data about the original identity that the requestor would like to be converted into synthetic data. For example, the information may include a name, birthdate, and/or social security number for a user. The information may include any other personal identifiable information or sensitive personal information that the person would like to protect or that would violate a privacy law to distribute, use, or collect. At step 420, the method creates cooperative synthetic identity information from the information corresponding to the original identity. For example, the method may convert a person whose name is "Bob Jones," with the birthdate "Apr. 2, 1980," and social security number 123-45-6789 to synthetic information: "AAA AAAA," "Jan. 1, 1000," and "111-11-1111." At step 430, method 400 associates the cooperative synthetic identity information with the case identifier, and at step 440 stores the cooperative synthetic identity information to the memory. The database may only store synthetic information or store both the synthetic information and the personally identifiable information or sensitive personal information in a manner that allows the method to be able to retrieve the personally identifiable information or sensitive personal information from the synthetic information upon a court order to do so. In that vein, the method may also include associating the cooperative synthetic identity information with the information corresponding to the original identity and storing the association between the cooperative synthetic identity information and the information corresponding to the original identity in the memory. At step 450, the method sends the cooperative synthetic identity information to the second requestor.

The method may also include receiving, from a second requestor, a request to create a cooperative synthetic identity case for the original identity. In response to receiving the request or separately from receiving the request, the method may include determining that the cooperative synthetic identity case has already been created for the original identity. The method may include retrieving the case identifier for the cooperative synthetic identity case that was created for the original identity from the memory.

In another embodiment of the present disclosure, the method may include determining that an expiration date of the expiration period associated with the cooperative synthetic identity case has passed, and deleting the cooperative synthetic identity case, the case identifier associated with the cooperative synthetic identity case, the expiration period for the cooperative synthetic identity case, and/or all cooperative synthetic identity information associated with the cooperative synthetic identity case from the memory. The method may include receiving an indication of an expiration period, for example from a user or from any type of input. For example a user may type in an expiration period, an expiration period may be set as a default, or a user may be given options and select an expiration period, among other methods. In another embodiment of the present disclosure, the method may include encrypting the cooperative synthetic identity information and/or sending the encrypted cooperative synthetic identity information to the second requestor. The method may include storing information to a secure database in the memory rather than unsecured memory. The database may be secured in one of many ways, including encrypting the database or password-protecting the database.

In another embodiment of the present disclosure, the method may include receiving a request from a second requestor for a plurality of related cooperative synthetic identity information. The request for the plurality of related cooperative synthetic identity information may include one or more (or a plurality of) case identifiers and/or one or more (or a plurality of) original identity information. The method may include creating one or more (or a plurality of) cooperative synthetic identity information corresponding to the one or more (or a plurality of) original identity information. The method may include associating the one or more (or a plurality of) cooperative synthetic identity information with the case identifier, storing one or more (or a plurality of) cooperative synthetic identity information and the case identifier to memory, and sending one or more (or a plurality of) cooperative synthetic identity information to the second requestor.

In another embodiment of the present disclosure, the method may include associating information identifying the original identity with the cooperative synthetic identity case. The method may also include storing the information identifying the original identity in the memory. The method may also include receiving from a second requestor a request for the original identity associated with the cooperative synthetic identity case. The method may also include retrieving the information identifying the original identity from the memory, and the method may include sending the information identifying the original identity to the second requestor. The method may send all of the data or only a minimum amount of data, the minimum amount that is necessary for an entity to correlate identities across organizations.

Figure 5:
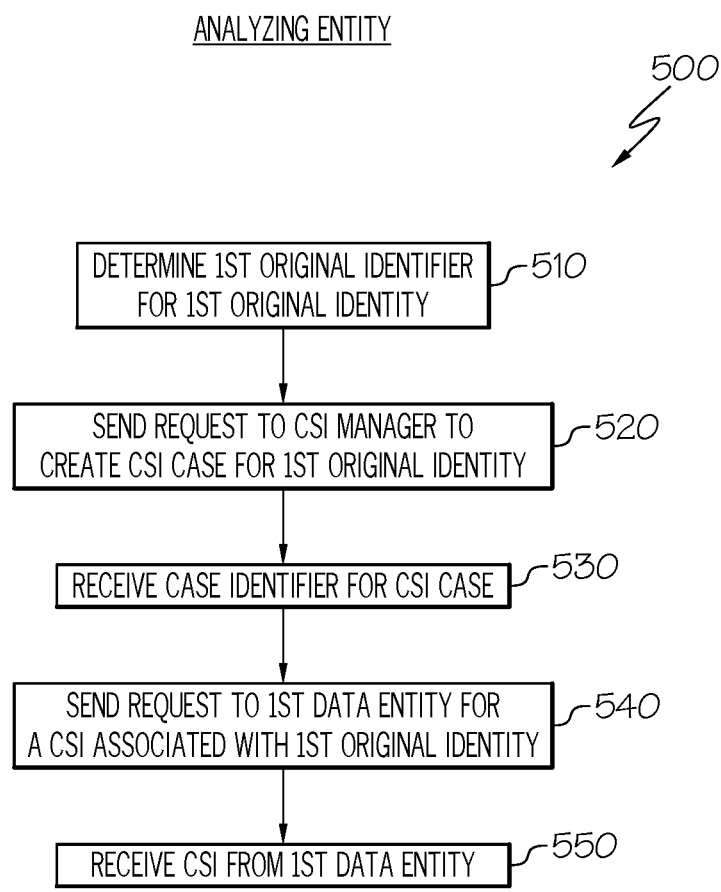
FIG. 5 illustrates a flow chart of a method for analyzing cooperative synthetic identities in accordance with a non-limiting embodiment of the present disclosure.

With reference to FIG. 5, a method 500 for analyzing cooperative synthetic identities is illustrated in accordance with a non-limiting embodiment of the present disclosure. At step 510, the method determines a first original identifier. The original identifier uniquely identifies a first original identity, for example a person whom the analyzing entity wishes to analyze data relating to. At step 520, the method sends a request to a cooperative synthetic identity manager to create a first cooperative synthetic identity case for the first original identity. At step 530, the method receives from the cooperative synthetic identity manager a first case identifier that uniquely identifies the first cooperative synthetic identity case. At step 540, the method requests first cooperative synthetic identity information from a first data entity. The first cooperative synthetic identity information comprises one or more of the first case identifier and the first original identifier. At step 550, the method receives the first cooperative synthetic identity information from the first data entity (e.g., a cell phone provider, internet service provider, or other entity that collects and/or stores identifiable information).

In another embodiment of the present disclosure, the method may include determining a second identifier, the second original identifier uniquely identifying a second original identity. The method may include sending a request to the cooperative synthetic identity manager to create a second cooperative synthetic identity case. The method may include receiving, from the cooperative synthetic identity manager, a second case identifier that uniquely identifies the second cooperative synthetic identity case. The method may include requesting second cooperative synthetic identity information from the first data entity. The second cooperative synthetic identity information request may include one or more of the second case identifier and/or the second original identifier. The method may include receiving the second cooperative synthetic identity information from the first data entity. The method may also include correlating the first cooperative synthetic identity information and the second cooperative synthetic identity information. For example, the analyzing entity may correlate one or more pieces of information with one or more other pieces of information. Entire sets of cooperative synthetic identity information may be correlated, or any portion of the set.

In another embodiment of the present disclosure, the method may include determining a second original identifier. The second original identifier may uniquely identify a second original identity. The method may include sending a request to the cooperative synthetic identity manager to create a second cooperative synthetic identity case. The method may also include receiving, from the cooperative synthetic identity manager, a second case identifier that uniquely identifies the second cooperative synthetic identity case. The method may also include requesting, from a second data entity, second cooperative synthetic identity information. The second cooperative synthetic identity information request may include one or more of the second case identifier and the second original identifier. The method may include receiving, from the second data entity, the second cooperative synthetic identity information. The method may also include correlating the first cooperative synthetic identity information and the second cooperative synthetic identity information. Entire sets of cooperative synthetic identity information may be correlated, or any portion of the set.

In another embodiment of the present disclosure, the first cooperative synthetic identity case may include an expiration period. The expiration period may be default in the system, specified by a user through an input such as a mouse or a keyboard, or by any other means. In this embodiment, the method may also include receiving an error from the first data entity indicating that the expiration period has lapsed. The method may also include sending a second request to the cooperative synthetic identity manager to create a second cooperative synthetic identity case for the first original identity. The method may send the second request by itself or in response to receiving the error. The method may include encrypting the request for the first cooperative synthetic identity information before sending the request to the first data entity and/or sending the request to the first data entity over an encrypted channel. The first cooperative synthetic identity information received from the first data entity may be encrypted.

In another embodiment of the present disclosure, the method includes requesting from the first data entity one or more (or a plurality of) cooperative synthetic identity information. The request for the one or more (or a plurality of) cooperative synthetic identity information may include one or more (or a plurality of) case identifiers and/or one or more (or a plurality of) original identifiers. The method may include receiving, from a first data entity, the one or more (or a plurality of) cooperative synthetic identity information. The method may also include creating a graph that interrelated the one or more (or a plurality of) cooperative synthetic identity information. For example, the method may include creating a social graph or a trend graph, or any other kind of graph interrelating data points. The method may include determining a piece of cooperative synthetic identity information of interest of the one or more (or a plurality of) cooperative synthetic identity information. The method may also include sending a request to the cooperative synthetic identity manager for original identity information that corresponds to the piece of cooperative synthetic identity information of interest. The method may also include receiving the original identity information that corresponds to the piece of cooperative synthetic identity information of interest from the cooperative synthetic identity manager. The method may include, for each possible pairing of pieces of cooperative synthetic identity information in the one or more (or a plurality of) cooperative synthetic identity information, determining whether a relationship exists between a first piece of cooperative synthetic identity information and a second piece of cooperative synthetic identity information in the pairing of cooperative synthetic identity information. Also for each pairing, the method may include analyzing the relationship, correlating data from the relationship or data from the cooperative synthetic identity information, and/or creating one or more graphs. The method may do so by itself or in response to determining that the relationship exists.

Figure 6:
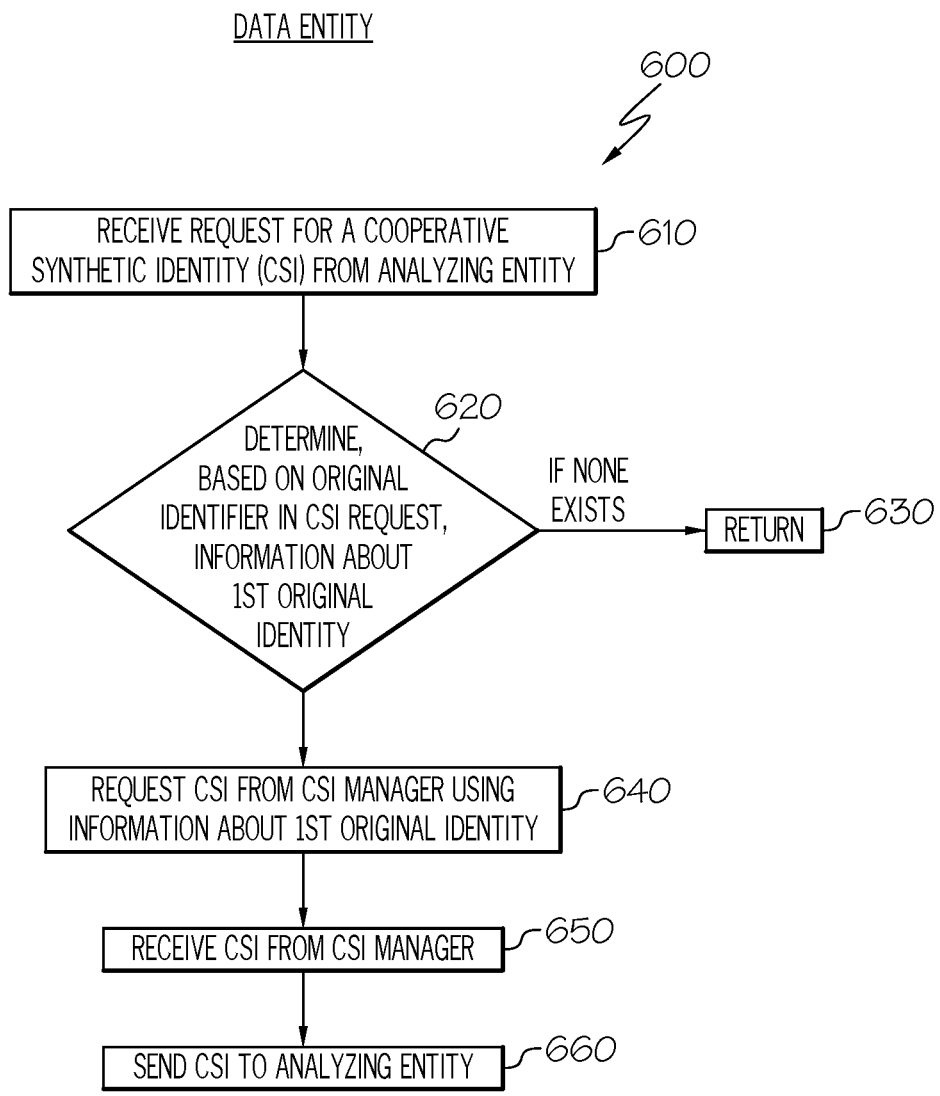
FIG. 6 illustrates a flow chart of a method for administering cooperative synthetic identities in accordance with a non-limiting embodiment of the present disclosure.

With reference to FIG. 6, a method 600 for administering cooperative synthetic identities is illustrated in accordance with a non-limiting embodiment of the present disclosure. At step 610, the method receives a request from an analyzing entity (e.g., NSA) for first cooperative synthetic identity information. The first cooperative synthetic identity information may include one or more of a first case identifier and a first original identifier. The first original identifier may unique identify a first original identity, for example a person whose information the NSA would like to analyze. At step 620, the method determines, based on the first original identifier, a plurality of information corresponding to the first original identity. For example, the method may retrieve information corresponding to the person from a database. If no information exists about the person, at step 630 the method returns and indicates that no information exists. If information about the person does exist, then at step 640 the method requests first cooperative synthetic identity information from a cooperative synthetic identity manager. The request to the cooperative synthetic identity manager may include one or more of the first case identifier and/or one or more (or a plurality of) information corresponding to the first original identity. At step 650, the method receives the first cooperative synthetic identity information from the cooperative synthetic identity manager. At step 660, the method sends the first cooperative synthetic identity information to the analyzing entity.

In another embodiment of the present disclosure, the method may include requesting first cooperative synthetic identity information from a cooperative synthetic identity manager. The request may include one or more of the first case identifier and/or one or more (or a plurality of) information corresponding to the first original identity. The method may also include receiving from the cooperative synthetic identity manager, a first error indicating that a first cooperative synthetic identity case associated with the first case identifier has expired. The method also may include sending a second error to the analyzing entity that the first cooperative synthetic identity case has expired. This may be performed by itself or in response to receiving the first error.

In another embodiment of the present disclosure, the method may include requesting, from a cooperative synthetic identity manager, first cooperative synthetic identity information. The request may include one or more of the first case identifier and/or one or more (or a plurality of) information corresponding to the first original identity. The method may also include receiving from the cooperative synthetic identity manager a first error indicating that a first cooperative synthetic identity case associated with the first case identifier has expired. The method may include sending a request to the cooperative synthetic identity manager to create a second cooperative synthetic identity case with a new expiration date. The method may also include receiving a second case identifier. The second case identifier uniquely identifies the second cooperative synthetic identity case. The sending and receiving may be done either on their own or in response to receiving the first error. The method may also include requesting, from the cooperative synthetic identity manager, the first cooperative synthetic identity information. The request may include one or more of the second case identifier and/or one or more of (or a plurality of) information corresponding to the first original identity. The method may also include receiving the first cooperative synthetic identity information from the cooperative synthetic identity manager. The method may also include sending the first cooperative synthetic identity information to the analyzing entity.

In another embodiment of the present disclosure, the method may include receiving from the analyzing entity a request to identify the first original identity associated with the first cooperative synthetic identity information. The method may also include determining the first original identity. The method may also include sending the first original identity to the analyzing entity. The first original identity sent to the analyzing entity may be encrypted and/or sent through an encrypted channel.

In another embodiment of the present disclosure, the method may include receiving a request for second cooperative synthetic identity information from an analyzing entity. The second cooperative synthetic identity information request may include a second case identifier. The method may also include determining that the second case identifier is the same as the first case identifier. In response to determining such (or by itself), the method may include requesting from the cooperative synthetic identity manager the first cooperative synthetic identity information. The request to the cooperative synthetic identity manager includes one or more of the second case identifier and/or one or more (or a plurality of) information corresponding to the first original identity. The method may include receiving from the cooperative synthetic identity manager the first cooperative synthetic identity information. The method may also include sending the first cooperative synthetic information to the analyzing entity. The method may also include determining that no information that corresponds to the first original identity exists. In response to determining such (or by itself), the method may include sending an error to the analyzing entity.

Example embodiments of the present disclosure follow:

EXAMPLE SCENARIO 1

Government Agency Analyzing Security Threats

Note: The following example is fictional with no connection to any real data, people, organizations, or security threat
Analyzer—Government security agency (GSA)
Collectors—Internet Service Provider (ISP), Cell Phone Service Provider (CPSP), government demographic agency (GDA)
Customers—People living in the US that are subject to government demographic data collection, and/or are clients of the ISP, and/or are clients of the CPSP
GSA profiling has indicated that members of terrorist cells within the US typically communicate with certain regions of the Middle East, communicate with each other, and live in multi-tenant dwellings in certain US large cities. The GSA wants to do behavioral/social analytics and mapping to identity potential terrorist cells in the US. To do this, the GSA must collect data for customers of the ISP, CPSP, and GDA while protecting PII and SPI.
  GSA (Analyzer) requests a case identifier from the Cooperative Synthetic Identity Manager (CSIM). GSA supplies a case expiration date with the request.
  CSIM creates the case and case identifier, associates the expiration data, and returns the case identifier to the GSA
  GSA supplies the case identifier to each collector with a request for the following data
    CPSP (Collector)—cell phone records and account data for people that communicate with certain regions of the Middle East
    ISP (Collector)—internet phone records and account data for people that communicate with certain regions of the Middle East
    GDA (Collector)—demographic data for people that live in multi-tenant dwellings in certain large US cities
  CPSP (Collector)
    Gathers cell phone records and account data for all individuals communicating with certain regions of the Middle East.
    Sends a request to the CSIM for a CSI (cooperative synthetic identity) for each individual identified in the phone records. The CPSP sends the case identifier to the CSIM along with the MRCID (Minimum Required Collaborative Identity Data) for each individual (name, address, phone number, email address, SSN)
  Since this is the first request associated with the case, the CSIM creates CSIs for each individual in the request from the CPSP. The CSIM generates a CSII (Cooperative Synthetic Identity Identifier) for each CSI, associates the CSIs with the case. It stores the MRCID for the associated individual with each CSI, and generates synthetic data for each piece of MRCID data in the CSI.
  CSIM returns the CSIIs for each CSI for the case to the CPSP
  CPSP supplies the cell phone records to the GSA, substituting the CSIIs for the individuals in the records.
  ISP (Collector)
    Gathers internet phone records and account data for all individuals communicating with certain regions of the Middle East.
    Sends a request to the CSIM for a CSI for each individual identified in the phone records. The ISP sends the case identifier to the CSIM along with the MRCID for each individual (name, address, phone number, email address, SSN)
  Since there has already been CSIs associated with the case, the CSIM checks for already existing CSIs for each individual in this request. If a CSI already exists, the CSIM adds any additional data from the MRCID that was not already in the CSI and creates synthetic data. If a CSI does not already exist for the individual, the CSIM creates it.
  CSIM returns the CSIIs for each CSI to the ISP
  ISP supplies the internet phone records to the GSA, substituting the CSIIs for the individuals in the records.
  GDA (Collector)
    Gathers demographic records for all individuals in all households that live in multi-tenant dwellings in certain large US cities.
    Sends a request to the CSIM for a CSI for each individual identified in the demographic records. The GDA sends the case identifier to the CSIM along with the MRCID for each individual (name, address, phone number)
  Since there has already been CSIs associated with the case, the CSIM checks for already existing CSIs for each individual in this request. If a CSI already exists, the CSIM adds any additional data from the MRCID that was not already in the CSI and creates synthetic data. If a CSI does not already exist for the individual, the CSIM creates it.
  CSIM returns the CSIIs for each CSI to the GDA
  GDA supplies the demographic records to the GSA, substituting the CSIIs for the individuals in the records.
  GSA performs behavioral/social analytics and mappings using the CSIIs. The GSA may also request the synthetic data (names, addresses, phone numbers, etc.) associated with CSIs if needed by the analytics/mapping software (for example, the synthetic data can be used for additional correlations while still protected PII and SPI).
  If the GSA finds sufficient evidence of a security threat, the GSA can obtain a court order to obtain the real data associated with only those CSIs identified in the court order.

CSIM deletes all CSIs associated with a case when the case's expiration data is reached

EXAMPLE SCENARIO 2

Government Agency Analyzing Emergency Communications

Note: The following example is fictional with no connection to any real data, people, or organizations
Analyzer—Government emergency agency (GEA)
Collectors—Internet Service Provider (ISP), Cell Phone Service Provider (CPSP), government demographic agency (GDA)
Customers—People living in the US that are subject to government demographic data collection, and/or are clients of the ISP, and/or are clients of the CPSP
GEA wants to assess the reach and effectiveness of emergency notifications sent to rural areas in Oklahoma.
Note: The scenario below is essentially the same as in the example above. However, in this case, the analyzer will never need to obtain the real identities associated with the CSIs.
- GEA (Analyzer) requests a case identifier from the Cooperative Synthetic Identity Manager (CSIM). GEA supplies a case expiration date with the request.
- CSIM creates the case and case identifier, associates the expiration data, and returns the case identifier to the GEA
- GEA supplies the case identifier to each collector with a request for the following data
  - CPSP (Collector)—cell phone records and account data for people that live in Oklahoma.
  - ISP (Collector)—internet phone records and account data for people that live in Oklahoma.
  - GDA (Collector)—demographic data for people that live in rural areas of Oklahoma.
- CPSP (Collector)
  - Gathers cell phone records and account data for all individuals in Oklahoma.
  - Sends a request to the CSIM for a CSI (cooperative synthetic identity) for each individual identified in the phone records. The CPSP sends the case identifier to the CSIM along with the MRCID (Minimum Required Collaborative Identity Data) for each individual (name, address, phone number, email address, SSN)
- Since this is the first request associated with the case, the CSIM creates CSIs for each individual in the request from the CPSP. The CSIM generates a CSII (Cooperative Synthetic Identity Identifier) for each CSI, associates the CSIs with the case. It stores the MRCID for the associated individual with each CSI, and generates synthetic data for each piece of MRCID data in the CSI.
- CSIM returns the CSIIs for each CSI for the case to the CPSP
- CPSP supplies the cell phone records to the GEA, substituting the CSIIs for the individuals in the records.
- ISP (Collector)
  - Gathers internet phone records and account data for all individuals in Oklahoma
  - Sends a request to the CSIM for a CSI for each individual identified in the phone records. The ISP sends the case identifier to the CSIM along with the MRCID for each individual (name, address, phone number, email address, SSN)
- Since there has already been CSIs associated with the case, the CSIM checks for already existing CSIs for each individual in this request. If a CSI already exists, the CSIM adds any additional data from the MRCID that was not already in the CSI and creates synthetic data. If a CSI does not already exist for the individual, the CSIM creates it.
- CSIM returns the CSIIs for each CSI to the ISP
- ISP supplies the internet phone records to the GEA, substituting the CSIIs for the individuals in the records.
- GDA (Collector)
  - Gathers demographic records for all individuals in all households in rural Oklahoma.
  - Sends a request to the CSIM for a CSI for each individual identified in the demographic records. The GDA sends the case identifier to the CSIM along with the MRCID for each individual (name, address, phone number)
- Since there has already been CSIs associated with the case, the CSIM checks for already existing CSIs for each individual in this request. If a CSI already exists, the CSIM adds any additional data from the MRCID that was not already in the CSI and creates synthetic data. If a CSI does not already exist for the individual, the CSIM creates it.
- CSIM returns the CSIIs for each CSI to the GDA
- GDA supplies the demographic records to the GEA, substituting the CSIIs for the individuals in the records.
- GEA performs behavioral/social analytics and mappings using the CSIIs. The GEA may also request the synthetic data (names, addresses, phone numbers, etc.) associated with CSIs if needed by the analytics/mapping software (for example, the synthetic data can be used for additional correlations while still protected PII and SPI).
- CSIM deletes all CSIs associated with a case when the case's expiration data is reached

EXAMPLE SCENARIO 3

Medical Software Vendor Wants to Test the Accuracy of Diagnostic Software

Note: The following example is fictional with no connection to any real data, people, or organizations
Test Data Consumer—Medical software vendor (MSV)
Test Data Provider—Test data vendor (TDV)
Collectors—Medical records managers (MRM), Gas drilling companies (GDC), map data collectors (MDC)
Customers—People living in the US that visit medical providers
MSV wants to test the accuracy of diagnostic software newly enhanced to diagnose illnesses potentially related to fracking well proximity.
Note: In the scenario below, the Test Data Provider essentially takes the place of the analyzer.
Neither Test Data Consumer nor the Test Data Analyzer will ever need to obtain the real identities associated with the CSI.
- MSV (Test Data Consumer) requests test data from TDV (Test Data Provider). MSV requires database that includes individuals with a mix of the following characteristics: no illness, illness potentially related to fracking, illness with no connection to fracking, residence in proximity to well, and residence not in proximity to well.

TDV (Test Data Provider) requests a case identifier from the Cooperative Synthetic Identity Manager (CSIM). TDV supplies a case expiration date with the request.

CSIM creates the case and case identifier, associates the expiration data, and returns the case identifier to the TDV TDV supplies the case identifier to each MRM requesting medical records of individuals—including individuals with no illness, potentially fracking related illness, and non-fracking related illness First MRM (Collector)
  Gathers medical records for individuals.
    Sends a request to the CSIM for a CSI (cooperative synthetic identity) for each individual identified in the medical records. The MRM sends the case identifier to the CSIM along with the MRCID (Minimum Required Collaborative Identity Data) for each individual (name, address, phone number, email address, SSN)
  Since this is the first request associated with the case, the CSIM creates CSIs for each individual in the request from the CPSP. The CSIM generates a CSII (Cooperative Synthetic Identity Identifier) for each CSI, associates the CSIs with the case. It stores the MRCID for the associated individual with each CSI, and generates synthetic data for each piece of MRCID data in the CSI.
  CSIM returns the CSIIs for each CSI for the case to the MRM
  MRM supplies the medical records to the TDV, substituting the CSIIs for the individuals in the records.

Subsequent MRMs
  Gathers medical records for individuals
  Sends a request to the CSIM for a CSI for each individual identified in the records. The MRM sends the case identifier to the CSIM along with the MRCID for each individual (name, address, phone number, email address, SSN)
  Since there has already been CSIs associated with the case, the CSIM checks for already existing CSIs for each individual in this request. If a CSI already exists, the CSIM adds any additional data from the MRCID that was not already in the CSI and creates synthetic data. If a CSI does not already exist for the individual, the CSIM creates it.
  CSIM returns the CSIIs for each CSI to the MRM
  MRM supplies the medical records to the TDV, substituting the CSIIs for the individuals in the records.

TDV performs analytics and mappings using the CSIIs along with well location data from the GDCs and address proximity to wells based on data from the MDCs. The TDV may also request the synthetic data (names, addresses, phone numbers, etc.) associated with CSIs if needed by the analytics/mapping software (for example, the synthetic data can be used for additional correlations while still protected PII and SPI). Using the data and analytics, the TDV builds a testing database for the MSV.

CSIM deletes all CSIs associated with a case when the case's expiration data is reached The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
  receiving, from a first requestor, a request to create a cooperative synthetic identity case for an original identity;
  determining whether a cooperative synthetic identity case has already been created for the original identity;
  in response to determining that the cooperative synthetic identity case has not already been created for the original identity, generating the cooperative synthetic identity case by replacing all personally identifiable information associated with the original identity with corresponding synthetic information;
  generating a case identifier that uniquely identifies the cooperative synthetic identity case;
  associating the case identifier with an expiration period;
  storing the cooperative synthetic identity case, the case identifier, and the expiration period to a single memory;
  associating the cooperative synthetic identity case with the personally identifiable information of the original identity;
  storing the association between the cooperative synthetic identity case and the personally identifiable information of the original identity to the single memory; and
  sending the case identifier to the first requestor.

2. The method of claim 1, further comprising:
  associating the corresponding synthetic information with the case identifier;

storing the corresponding synthetic information to the memory; and sending the corresponding synthetic information to a second requestor.

3. The method of claim 1, further comprising:

receiving, from a second requestor, a request to create the cooperative synthetic identity case for the original identity;

determining that the cooperative synthetic identity case has already been created for the original identity;

retrieving the case identifier for the cooperative synthetic identity case that was created for the original identity from the memory; and retrieving corresponding synthetic information associated with the cooperative synthetic identity case from the memory.

4. The method of claim 1, further comprising:

determining that an expiration date of the expiration period associated with the cooperative synthetic identity case has passed; and deleting the cooperative synthetic identity case, the case identifier associated with the cooperative synthetic identity case, the expiration period for the cooperative synthetic identity case, and the corresponding synthetic information associated with the cooperative synthetic identity case from the memory.

5. The method of claim 2, further comprising:

encrypting the corresponding synthetic information; and sending the encrypted corresponding synthetic information to the second requestor.

6. The method of claim 1, further comprising receiving from a user an indication of the expiration period.

7. The method of claim 1, further comprising:

associating information identifying the original identity with the cooperative synthetic identity case;

storing the information identifying the original identity in the memory;

receiving, from a second requestor, a request for the original identity associated with the cooperative synthetic identity case;

retrieving the information identifying the original identity from the memory; and sending the information identifying the original identity to the second requestor.

8. A computer configured to access a storage device, the computer comprising:

a processor; and a non-transitory, computer-readable storage medium storing computer-readable instructions that when executed by the processor cause the computer to perform:

in response to receiving, from a first requestor, a request to create a cooperative synthetic identity case for an original identity, determining, using the processor, whether a cooperative synthetic identity case has already been created for the original identity;

in response to determining that the cooperative synthetic identity case has not already been created for the original identity, generating the cooperative synthetic identity case by replacing all personally identifiable information associated with the original identity with corresponding cooperative synthetic identity information;

generating a case identifier that uniquely identifies the cooperative synthetic identity case;

associating the case identifier with an expiration period;

storing the cooperative synthetic identity case, the case identifier, and the expiration period to a memory;

associating the cooperative synthetic identity case with the personally identifiable information of the original identity;

storing the association between the cooperative synthetic identity case and the personally identifiable information of the original identity to the single memory; and sending the case identifier to the first requestor.

9. The computer of claim 8, wherein the computer-readable instructions further cause the computer to perform:

associating the corresponding cooperative synthetic identity information with the case identifier;

storing the corresponding cooperative synthetic identity information to the memory; and sending the corresponding cooperative synthetic identity information to a second requestor.

10. The computer of claim 8, further comprising:

in response to receiving, from a second requestor, a request to create the cooperative synthetic identity case for the original identity, determining that the cooperative synthetic identity case has already been created for the original identity;

retrieving the case identifier for the cooperative synthetic identity case that was created for the original identity from the memory; and retrieving the corresponding cooperative synthetic identity information associated with the cooperative synthetic identity case from the memory.

11. The method of claim 8, wherein the computer-readable instructions further cause the computer to perform:

determining that an expiration date of the expiration period associated with the cooperative synthetic identity case has passed; and deleting the cooperative synthetic identity case, the case identifier associated with the cooperative synthetic identity case, the expiration period for the cooperative synthetic identity case, and the corresponding cooperative synthetic identity information associated with the cooperative synthetic identity case from the memory.

12. The method of claim 9, wherein the computer-readable instructions further cause the computer to perform:

encrypting the corresponding cooperative synthetic identity information; and sending the encrypted corresponding cooperative synthetic identity information to the second requestor.

13. The method of claim 8, wherein the computer-readable instructions further cause the computer to perform receiving from a user an indication of the expiration period.

14. A non-transitory computer-readable storage medium storing instructions that are executable to cause a system to perform operations comprising:

receiving, from a first requestor, a request to create a cooperative synthetic identity case for an original identity;

determining whether a cooperative synthetic identity case has already been created for the original identity;

in response to determining that the cooperative synthetic identity case has not already been created for the original identity, generating the cooperative synthetic identity case by replacing all personally identifiable information associated with the original identity with corresponding synthetic information;

generating a case identifier that uniquely identifies the cooperative synthetic identity case;

associating the case identifier with an expiration period;

storing the cooperative synthetic identity case, the case identifier, and the expiration period to a single memory;

associating the cooperative synthetic identity case with the personally identifiable information of the original identity;

storing the association between the cooperative synthetic identity case and the personally identifiable information of the original identity to the single memory; and sending the case identifier to the first requestor.

* * * * *